United States Patent
Paeschke et al.

(10) Patent No.: US 8,812,842 B2
(45) Date of Patent: Aug. 19, 2014

(54) MOTOR VEHICLE DISPLAY DEVICE, MOTOR VEHICLE ELECTRONIC SYSTEM, MOTOR VEHICLE, METHOD FOR DISPLAYING DATA AND A COMPUTER PROGRAM PRODUCT

(75) Inventors: Manfred Paeschke, Wandlitz (DE); Frank Dietrich, Berlin (DE); Jörg Fischer, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 491 days.

(21) Appl. No.: 13/129,411

(22) PCT Filed: Nov. 4, 2009

(86) PCT No.: PCT/EP2009/064590
§ 371 (c)(1),
(2), (4) Date: Aug. 9, 2011

(87) PCT Pub. No.: WO2010/057771
PCT Pub. Date: May 27, 2010

(65) Prior Publication Data
US 2011/0296180 A1  Dec. 1, 2011

(30) Foreign Application Priority Data

Nov. 18, 2008  (DE) .......................... 10 2008 043 830

(51) Int. Cl.
*H04L 29/06* (2006.01)
*G09F 3/00* (2006.01)
(52) U.S. Cl.
CPC .................................. *G09F 3/0292* (2013.01)
USPC ............. 713/168; 713/156; 726/21; 348/154; 348/155; 348/156
(58) Field of Classification Search
CPC ..................................................... G09F 3/0292
USPC .............. 713/156, 168; 726/21; 348/154–156
See application file for complete search history.

(56) References Cited

U.S. PATENT DOCUMENTS

| 5,657,008 | A | 8/1997 | Bantli |
| 6,859,149 | B1* | 2/2005 | Ohta et al. .................... 340/990 |
| 7,197,637 | B2* | 3/2007 | Schmidt et al. ............... 713/157 |
| 2004/0003237 | A1* | 1/2004 | Puhl et al. ..................... 713/156 |
| 2004/0070505 | A1 | 4/2004 | Pluvinage |

FOREIGN PATENT DOCUMENTS

| FR | 2619944 | 3/1989 |
| WO | WO 92/13737 A | 8/1992 |
| WO | WO 2007/137555 A | 12/2007 |

* cited by examiner

*Primary Examiner* — Hadi Armouche
*Assistant Examiner* — Dao Ho

(57) ABSTRACT

The invention relates to a motor vehicle display apparatus having an electronic appliance containing:
a first memory area (117) for storing data (109), wherein the data contain a motor vehicle license number,
a second memory area (119) for storing at least one first certificate (178),
a first interface (103) for receiving a first signal (109') and a signature (111', 113') for the first signal from a transmitter (107'),
means (123) for checking the validity of the signature of the first signal using the first certificate,
means (139) for generating a second signal on the basis of the reception of the first signal,
means (127) for actuating a display apparatus (136) to reproduce the data stored in the first memory area and to visually output the second signal,
wherein the second signal is generated and/or output only if the signature is valid.

24 Claims, 6 Drawing Sheets

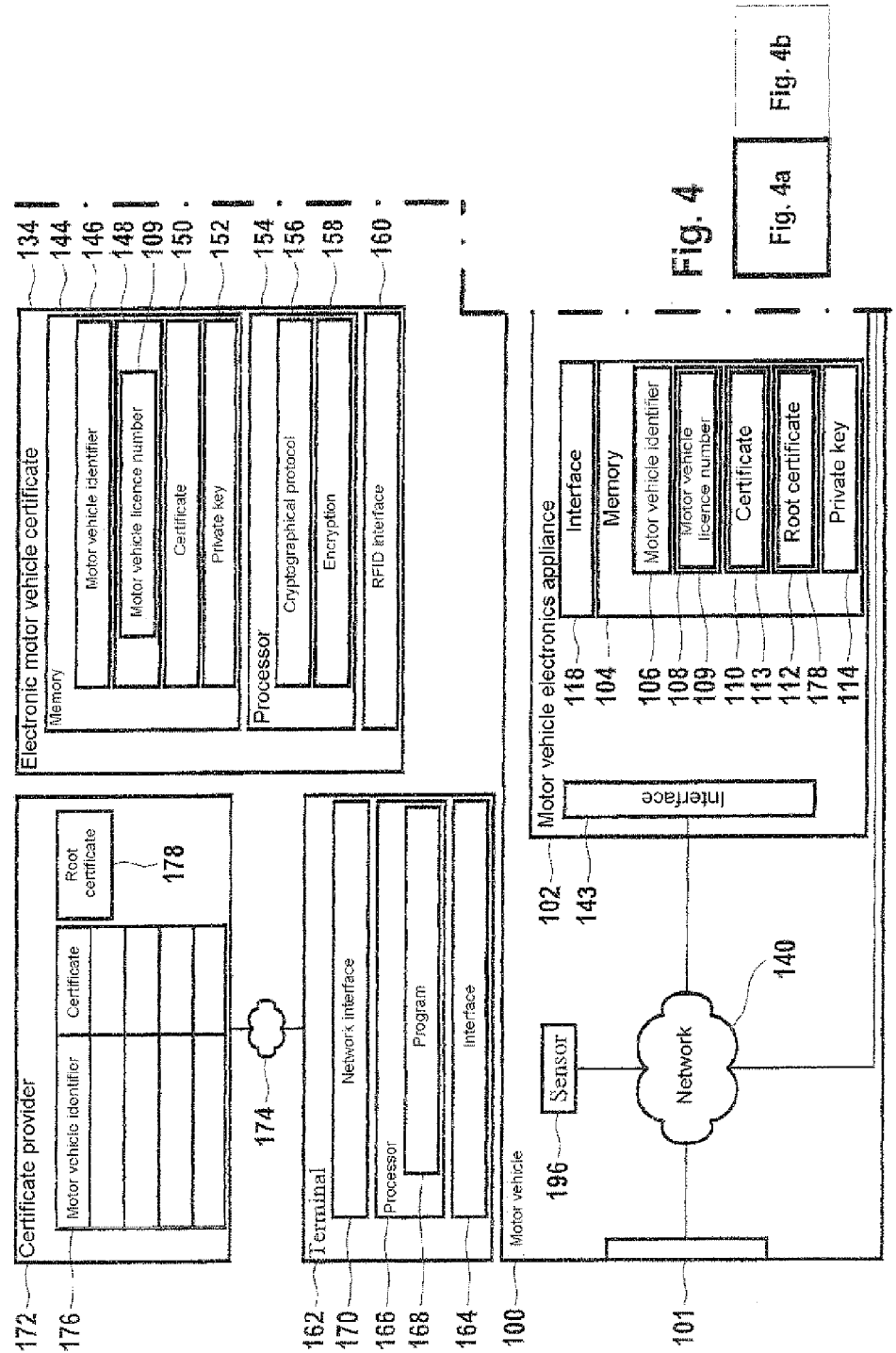

Figure 1:
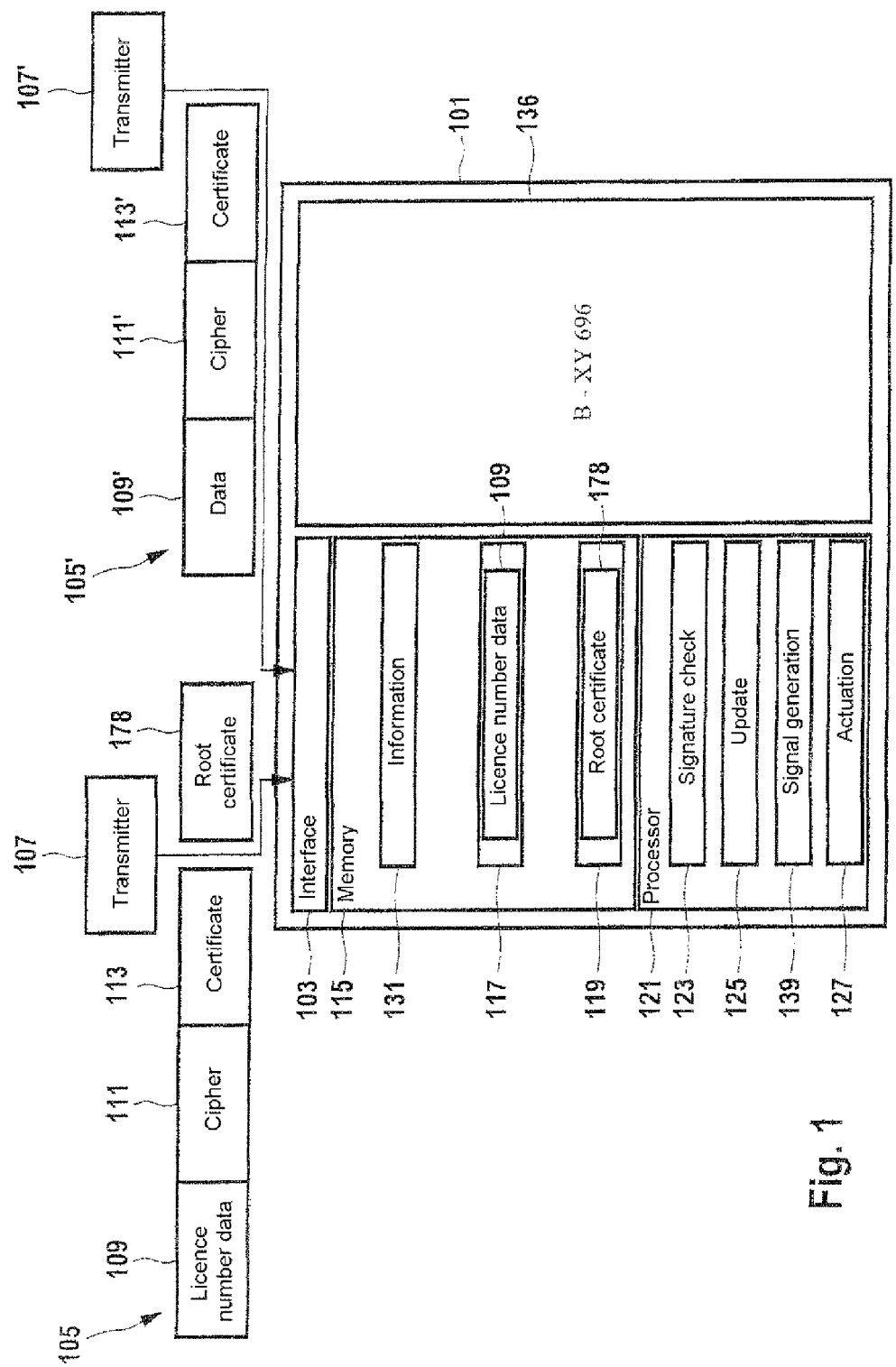

MOTOR VEHICLE DISPLAY DEVICE, MOTOR VEHICLE ELECTRONIC SYSTEM, MOTOR VEHICLE, METHOD FOR DISPLAYING DATA AND A COMPUTER PROGRAM PRODUCT

FIELD OF DISCLOSURE

The invention relates to a motor vehicle display apparatus, a motor vehicle electronics system, a motor vehicle, a method for displaying data and a computer program product.

BACKGROUND

U.S. Pat. No. 5,657,008 discloses an electronic motor vehicle license plate which stores a vehicle identification number. The vehicle identification number is used for checking whether the electronic motor vehicle license plate actually belongs to the motor vehicle to which it is fitted.

WO 2007/137555 A2 discloses an electronically configurable motor vehicle license plate with a display. In order to configure the motor vehicle license plate, data are compiled and encrypted in an external configuration unit. The encrypted data are transmitted as infrared signals by an infrared transmitter integrated in the configuration unit. The display electronics for the motor vehicle license plate are used to decrypt the signals, for which purpose appropriate decryption software is stored in the display electronics.

US 2007/0285361 A1 discloses a system for wireless electronic motor vehicle license plates. Data can be input into the electronic motor vehicle license plate only by persons who are authorized to do so, specifically using a secret code.

The patent application DE 102008042259.2 (BUND.208.12 DE), without prior publication at the time of filing, from the same applicant discloses a motor vehicle electronics appliance which is designed to receive data from an ID token and to actuate a motor vehicle display apparatus to display said data. Further motor vehicle display apparatuses are known from the patent applications BUND.208.14de and BUND.208.12 de (official file numbers: DE 102008043123.0 and DE 102008042259.2), likewise without prior publication at the time of filing, from the same applicant.

DETAILED DESCRIPTION

By contrast, the invention is based on the object of providing an improved motor vehicle display apparatus, a motor vehicle electronic system, a motor vehicle and a method for visual output and an appropriate computer program product.

The objects on which the invention is based are each achieved by means of the features of the independent patent claims. Embodiments of the invention are specified in the dependent patent claims.

In accordance with embodiments of the invention, the motor vehicle display apparatus has an electronic appliance and a display apparatus which form a physical unit. By way of example, the format of the motor vehicle display apparatus may roughly correspond to the dimensions of a motor vehicle license plate hitherto customary in the prior art. A motor vehicle display apparatus of this kind is also called an electronic motor vehicle license plate.

The electronic appliance has a first memory area for storing data and a second memory area for storing at least one first certificate. In addition, the electronic appliance has a first interface for receiving a first signal and a signature for the first signal from a transmitter. The first interface may also be used to receive the data and a signature for the data and also at least the first certificate. The first signal, the data and the respective signatures thereof and the first certificate can be received from the same or different transmitters.

The electronic appliance has means for checking the validity of the signature of the first signal using the first certificate; these means for checking the validity can also be used for checking the validity of the signature of the data using the first certificate.

In addition, the electronic appliance has means for generating a second signal using the first signal and means for actuating the display apparatus to reproduce the data stored in the first memory area and to visually output the second signal.

A necessary prerequisite for the generation and/or visual output of the second signal is that the signature of the first signal is valid. Only if said prerequisite is met is the second signal visually output using means for actuating the display apparatus.

A necessary prerequisite for storing the data in the first memory area is that the signature is valid. Only then are these data reproduced using means for actuating the display apparatus.

A corresponding situation applies to the reproduction of the data when they are received from a transmitter: a necessary prerequisite for storing the data in the first memory area is that the signature of the data is valid. Only then are these data reproduced using means for actuating the display apparatus.

Embodiments of the invention are particularly advantageous, since the motor vehicle display apparatus provides an electronic motor vehicle license plate which is used not only for reproducing the motor vehicle license number but also for visually outputting a further signal, i.e. the second signal. The second signal is generated and/or visually output via the display apparatus only if the first signal and the signature thereof have been received beforehand via the first interface of the electronic appliance and if said signature of the first signal is valid.

In accordance with one embodiment of the invention, the first signal is used to receive a piece of information from the transmitter. This piece of information can be used in unaltered form for generating the second signal, so that the piece of information is output visually via the display apparatus. Before the second signal is generated, the piece of information can also be processed further by adding to or modifying the piece of information, for example. In this case, the second signal is generated in order to output the result of the further processing of the information via the display apparatus.

In accordance with one embodiment of the invention, the first signal is a test signal which is sent by a police patrol vehicle which is close by the motor vehicle, for example, in order to check the authenticity of the motor vehicle display apparatus. On the basis of the reception of the test signal and the valid signature thereof, the motor vehicle display apparatus generates the second signal and outputs it visually, for example. This visual output is picked up by a reader in the patrol vehicle, for example, and compared with a reference signal. If the second signal and the reference signal match, a condition for the authenticity of the motor vehicle display apparatus is satisfied.

In accordance with one embodiment of the invention, the first signal contains a command, such as a request command for requesting a particular piece of information from the motor vehicle display apparatus. By way of example, this information may be a vehicle parameter and/or a charge status for the motor vehicle.

By way of example, the vehicle parameter may be the speed of the motor vehicle, a noise level or an exhaust value. In particular, the first signal may request what class of pollutant the motor vehicle meets, particularly on the basis of the applicable fine particulates regulation.

As an alternative or in addition, a charge status can be requested from the motor vehicle display apparatus by virtue of the reception of the first signal and the valid signature thereof. This allows a check to determine whether the prescribed charges, taxes and/or contributions, particularly toll charges, motor vehicle taxes and/or exhaust charges, have been paid for the motor vehicle.

In accordance with one embodiment of the invention, the motor vehicle display apparatus takes reception of the request command as a basis for accessing a memory area which stores the requested information item. The content of this memory area is then read in order to generate the second signal, which carries the requested information. By way of example, the information stored in the memory area of the motor vehicle display apparatus is updated at regular or irregular intervals of time.

As an alternative or in addition, the motor vehicle display apparatus requests the information, for its part, from a motor vehicle electronics appliance, such as what is known as an electronic control unit (ECU), or a sensor in the motor vehicle, for example by virtue of the motor vehicle display apparatus sending an appropriate request command via a motor vehicle bus to the ECU or the sensor.

In accordance with one embodiment of the invention, the data are reproduced on the display apparatus such that the reproduction can be picked up visually and cognitively by a user. Preferably, the reproduction is effected such that the reproduction corresponds roughly to the visual impression of a license number imprinted on a standard motor vehicle license plate. By contrast, the second signal can be output such that, depending on the embodiment, it can be picked up visually and cognitively by a user, can be picked up only visually but not cognitively by a user or can be picked up neither visually nor cognitively by a user.

By way of example, the second signal can be output via the display apparatus by actuating a single pixel or a group of pixels on the display apparatus with the second signal, the second signal being modulated with the information item which is to be visually output. By way of example, the pixel or the group of pixels can have their brightness modulated in order to output the second signal, the modulation being able to be chosen such that it is visually imperceptible to a user, for example because the brightness fluctuations are so small that they are imperceptible to the naked eye.

Embodiments of the invention are particularly advantageous, since the first interface can be used to receive the first certificate, which allows the certificate(s) stored in the electronic appliance to be updated. The reason is that the certificates of a public key infrastructure (PKI) usually have a limited validity of between two and three years, for example. When this validity period has expired, it is thus necessary to update the certificate(s), which, in line with the invention, can be done via the interface of the electronic appliance.

In accordance with one embodiment of the invention, the first certificate is what is known as a root certificate, which can be used to perform a certificate chain check for checking the validity of the signature of the data.

In accordance with one embodiment of the invention, the electronic appliance is an integrated electronic circuit, such as what is known as an RFID chip.

The first interface of the electronic appliance may be designed for wireless reception of the first signal, the signature of the first signal, the data, the signature of the data and/or the first certificate from an external transmitter. As an alternative or in addition, the first interface may also be designed such that the first signal, the signature of the first signal, the data, the signature of the first signal and/or the first certificate can be received from an internal transmitter which is part of the motor vehicle, such as from a motor vehicle electronics appliance, particularly what is known as an electronic control unit (ECU).

In accordance with one embodiment of the invention, the electronic appliance and the display apparatus are inseparably connected to one another, so that nondestructive separation of the electronic appliance and the display apparatus is not possible. By way of example, this is achieved by virtue of the electronic appliance and the display apparatus being connected to one another by a potting compound to such a profound extent that the attempt at separation inevitably results in destruction of the electronic appliance and/or the display apparatus.

In accordance with one embodiment of the invention, the electronic appliance contains means for cryptographically authenticating the transmitter, for example on the basis of what is known as a challenge-response protocol. The data received from the transmitter are stored in the first memory area only if such cryptographic authentication has been performed successfully.

In accordance with one embodiment of the invention, the electronic appliance contains means for reciprocal cryptographic authentication of the electronic appliance and the transmitter. This ensures that the transmitter sends the data only to a valid electronic appliance.

In accordance with a further embodiment of the invention, the electronic appliance has a memory area for storing a motor vehicle identifier. The motor vehicle identifier is an identifier which explicitly identifies a motor vehicle, such as the chassis number of the motor vehicle. The motor vehicle identifier stored in the memory area explicitly associates the motor vehicle display apparatus with the motor vehicle having the same motor vehicle identifier. This association may be designed to be unalterable. A further prerequisite for the generation and/or output of the second signal and/or the storage of the data in the first memory area for display thereof on the display apparatus may then be that the first interface is used to receive a tag which is identical to the motor vehicle identifier stored in the memory area.

In accordance with a further embodiment of the invention, the motor vehicle display apparatus may be an electronic motor vehicle license plate, i.e. a motor vehicle license plate which is equipped with a display on which the license number of the motor vehicle is reproduced.

In a further aspect, the invention relates to a motor vehicle electronic system having an embodiment of the motor vehicle display apparatus according to the invention and having a motor vehicle electronics appliance.

In accordance with embodiments of the invention, the motor vehicle electronics appliance has a second interface for setting up a first connection to an external transmitter, such as a first ID token, in order to read data from the first ID token. The first ID token may be a document, particularly a value or security document, which incorporates an electronic memory and an interface for setting up the connection to the second interface of the motor vehicle electronics appliance. In particular, the document may incorporate an RFID chip which stores the data.

In accordance with the invention, a "document" is understood to mean paper-based and/or plastic-based documents, such as identity documents, particularly passports, identity cards, visas and drivers' licenses, vehicle registration certificates, vehicle registration documents, corporate identity cards, health cards or other ID documents, such as official identity cards, and also chip cards, means of payment, particularly bankers' cards and credit cards, waybills or other credentials, which incorporate a data memory for storing at least one attribute.

The document may preferably be an electronic vehicle registration certificate or vehicle registration document or another motor vehicle document.

The motor vehicle electronics appliance has a memory for storing a certificate from a public key infrastructure (PKI). By way of example, the certificate may comply with the X.509 standard. The same or another memory in the motor vehicle electronics appliance may also store what is known as a root certificate from said PKI. The certificate and the root certificate typically have a limited validity period which is specified in the certificate or the root certificate.

The motor vehicle electronics appliance also has means for authentication to the first ID token using the certificate. By way of example, the authentication is effected using a challenge-response method. To this end, the motor vehicle electronics appliance transmits its certificate via the first connection to the first ID token. The latter generates a challenge, for example in the form of a random number, which the first ID token encrypts using the public key from the certificate and transmits the cipher via the first connection to the motor vehicle electronics appliance. The motor vehicle electronics appliance then needs to have the private key associated with the certificate in order to be able to correctly decrypt said cipher.

Optionally, provision may be made for the first ID token also to have to authenticate itself to the motor vehicle electronics appliance before the data are read from the first ID token. This can be done in similar fashion to the authentication of the motor vehicle electronics appliance to the ID token. By way of example, the procedure is thus that the ID token transmits its certificate to the motor vehicle electronics appliance via the first connection and then the challenge-response method is performed. For the check on the validity of the certificate from the first ID token, the motor vehicle electronics appliance can use the root certificate.

The external transmitter may also be a fixed or mobile transmitter, e.g. from an authority or from the police, which transmits the first signal. The second interface is then used to receive the first signal from an external transmitter of this kind.

In order to receive the first signal from the external transmitter, the first connection is thus first of all set up between the motor vehicle electronics appliance and the first transmitter. The certificate from the motor vehicle electronics appliance is used to perform unilateral or reciprocal cryptographical authentication of the motor vehicle electronics appliance and the external transmitter. When the authentication has been performed successfully, the external transmitter sends the first signal and the signature of the first signal via the first connection to the motor vehicle electronics appliance. The check on the validity of the signature of the first signal and/or the generation of the second signal when the signature of the first signal is valid can be effected by the motor vehicle electronics appliance. In this case, the motor vehicle electronics appliance sends the second signal to the motor vehicle display apparatus, so that the second signal is visually output by the motor vehicle display apparatus. Alternatively, the motor vehicle electronics appliance forwards the first signal and the signature thereof to the motor vehicle display apparatus, so that the latter checks the signature of the first signal and, where appropriate, generates the second signal.

In accordance with the one embodiment of the invention, the second signal is signed by the motor vehicle display apparatus and/or by the motor vehicle electronics appliance. In addition to the second signal, the signature of the second signal is then also visually output by means of the display apparatus. This provides further protection against illegal falsification or readjustment of the second signal.

In accordance with one embodiment of the invention, the motor vehicle electronics appliance has means for actuating at least one motor vehicle display apparatus according to the invention to reproduce the data. By way of example, two display apparatuses are present which are arranged at the front and at the back of a motor vehicle instead of the customary license plates. The display apparatuses have at least one display each, with various display technologies being able to be used.

By way of example, the displays are designed such that the data can be reproduced even without continual supply of power. Such displays require electric power only when the data to be reproduced change.

By way of example, these are bistable displays, such as electrophoretic displays, electrochromic displays, rotating element displays, ferroelectric displays, displays based on the electrowetting effect and bistable LCD displays, for example twisted nematic, super twisted nematic, cholesteric or nematic LCD displays. They may also be hybrid displays which combine various forms of these display technologies.

In addition, the prior art discloses flexible bistable displays which are commercially available from the Citala company. Such displays are also known from US 2006/0250534 A1. Further bistable electrophoretic displays are known from WO 99/53371 and EP 1 715 374 A1, for example.

Bistable displays are also called "Electronic Paper Displays" (EPDs).

Bistable displays of this kind generally have the advantage that they are very easy to read under bright lighting and that no supply of power is required in order to reproduce image data which are constant over a long time.

It is also possible to use emissive displays, which require a supply of power in order to reproduce the data. By way of example, these may be LED displays, particularly inorganic, organic or hybrid LED displays. The display apparatus may also be implemented on the basis of an electroluminescent medium, as is known per se from US 2002/0079494 A1 and U.S. Pat. No. 6,091,194, for example.

The display apparatus may also be wholly or partially provided typographically and thus form a profound and unbreakable connection to the motor vehicle or to portions of the motor vehicle. The production of TFTs, for example, by directly applying them using printing technology is known per se from WO 03/098696 A1.

The motor vehicle electronics appliance also has a third interface for storing the certification in the memory. The third interface can thus be used to access the memory of the motor vehicle electronics appliance in order to transmit and store the certificate therein, for example in order to put the certificate into the memory for the first time in a new motor vehicle or in order to update the certificate.

In accordance with one embodiment of the invention, the data which are read from the first ID token via the second interface contain the motor vehicle license number for the motor vehicle. By way of example, the motor vehicle license number has changed on account of notification of a change of ownership at a motor vehicle registration office. The amended motor vehicle license number is stored in the first ID token by the registration office. This can be done online by virtue of a secure connection being set up between the first ID token and a server computer, which connection is used to write the data with the new motor vehicle license number to the first ID token. A secure connection of this kind can be implemented by means of end-end encryption via a client computer to which a reader for the first ID token is connected, for example. The data with the new motor vehicle license number may have been signed by the motor vehicle registration office.

Embodiments of the present invention are particularly advantageous, since complete electronic handling of the updating of the motor vehicle license number becomes possible. In particular, it is no longer necessary to produce and fit new license plates. This allows significant amounts of resources to be saved and trash to be avoided. In addition, there is also no need for the visits to the authorities that were previously associated with the issuing of new motor vehicle license plates.

Embodiments of the present invention are particularly advantageous, since the motor vehicle license number is updated in a particularly secure manner with maximum convenience for the user by transmitting the data from the first ID token to the motor vehicle electronics appliance. This is achieved by using cryptographical methods based on a PKI, for example for the unilateral or reciprocal authentication of the motor vehicle electronics appliance and the first ID token, and/or by virtue of the signature of the data received from the first ID token being checked by the motor vehicle electronics appliance and/or by means of cryptographical protection of the first connection, which the motor vehicle electronics appliance uses to receive the data from the first ID token.

In accordance with one embodiment of the invention, the second interface of the motor vehicle electronics appliance is of contactless design, for example in the form of a radio interface, particularly in the form of a contactless interface operating on the basis of an RFID method. In particular, the second interface may be designed such that it is also used to address an electronic key for the motor vehicle. By way of example, the electronic key may be a chip card, such as an RFID chip card. Alternatively, a further interface may also be provided for communication with the electronic key, particularly an RFID interface.

In accordance with one embodiment of the invention, the third interface of the motor vehicle electronics appliance is of contact-based design. By way of example, the third interface is provided for the purpose of connecting a cable. In particular, the motor vehicle electronics appliance may be in the form of what is known as an electronic control unit (ECU) in the motor vehicle. For diagnostic and/or servicing purposes, the ECU is connected to an external appliance, for example a terminal, in a motor vehicle workshop or a technical test center. This cable can then be used to set up a connection between the external appliance and the ECU, which connection can be used to store the certificate in the memory in order to update it, for example. This can be done when the motor vehicle is being serviced or on the occasion of what is known as a general inspection of the motor vehicle, for example.

In accordance with one embodiment of the invention, the third interface is provided for the purpose of producing a network connection, which can be done in contact-based or contactless fashion. By way of example, the third interface is in the form of a mobile radio interface based on a mobile radio standard, as a result of which the certificate can be received via mobile radio.

In accordance with one embodiment of the invention, the third interface is first of all used to request an explicit motor vehicle identifier which is stored in the motor vehicle electronics appliance. By way of example, the motor vehicle identifier may be the chassis number of the motor vehicle. This motor vehicle identifier is then used to generate or retrieve a certificate which is associated with the relevant motor vehicle or the display apparatus thereof.

In accordance with one embodiment of the invention, the second interface is designed for communication with a second ID token. The second ID token is used for access control for the motor vehicle. Possession of the second ID token is a prerequisite for the motor vehicle being able to be opened and/or started by the user. By way of example, the second ID token is an RFID chip card which is used as an electronic key ("E-key").

The second ID token stores a key identifier. Said key identifier is requested from the second ID token by the motor vehicle electronics appliance via the second interface thereof. If the key identifier received from the second ID token via the second interface matches a reference value, stored in the motor vehicle electronics appliance, for the key identifier then the motor vehicle electronics appliance generates a signal in order to unlock the central locking of the motor vehicle and/or to enable the engine of the motor vehicle to be started, for example.

Instead of the second interface, there may also be a further interface provided for the communication between the motor vehicle electronics appliance and the second ID token, e.g. a further RFID interface which has a greater range than the second interface. The range of the further interface is chosen such that the second ID token is picked up by the motor vehicle electronics appliance when the second ID token is still outside of the motor vehicle, whereas the range of the second interface is chosen such that the first ID token must be inside the motor vehicle interior in order for the first connection to be able to be set up. Thus, a prerequisite for update of the motor vehicle license number is then that the user must first of all unlock and get into the motor vehicle.

Preferably, the key identifier chosen is not the motor vehicle identifier. This has the advantage that in the event of the second ID token being lost, said second ID token can be replaced by another by virtue of another key identifier having been stored. The second interface of the motor vehicle electronics appliance is preferably designed such that it can be used to access the memory area of the motor vehicle electronics appliance which stores the key identifier in order to replace the key identifier stored therein for the lost second ID token with the new key identifier of the new second ID token. By way of example, the new key identifier has been signed, with the motor vehicle electronics appliance checking the validity of the signature before the old key identifier is replaced by the new key identifier.

In accordance with one embodiment of the invention, the motor vehicle electronics appliance has means for setting up a protected data transmission channel for actuating the at least one motor vehicle display apparatus. By way of example, the data transmission via this data transmission channel is effected in encrypted form in order to prevent the actuation of the at least one display apparatus from being manipulated.

In a further aspect, the invention relates to a motor vehicle having at least one externally visible motor vehicle display apparatus arranged on the motor vehicle.

In accordance with one embodiment of the invention, the motor vehicle contains an embodiment of the motor vehicle electronic system according to the invention. Such a motor vehicle is particularly advantageous, since the license number can be updated in simultaneously convenient and secure fashion. In particular, it is particularly advantageous that the previously required interchange of the license plates when the license number of the motor vehicle is changed can be avoided in accordance with the invention, which means that the costs of manufacture for the new license plates, the logistical involvement for the provision thereof and also the costs for disposing of the old license plates can be dispensed with.

In a further aspect, the invention relates to a method for displaying data on an embodiment of a motor vehicle display apparatus according to the invention. A necessary prerequisite for the display of the data is that the data are received in signed form from a transmitter and that this signature is valid. In order to check the validity of the signature, a certificate stored in a memory area of the motor vehicle display apparatus, particularly what is known as a root certificate, is used. The root certificate is updated via the interface of the motor vehicle display apparatus, for example on the occasion of regular servicing and/or on the occasion of what is known as a general inspection.

In a further aspect, the invention relates to a computer program product with executable instructions for performing an embodiment of a method according to the invention. By way of example, the computer program is designed for execution by a microprocessor in the electronic appliance of the motor vehicle display apparatus.

Figure 2:
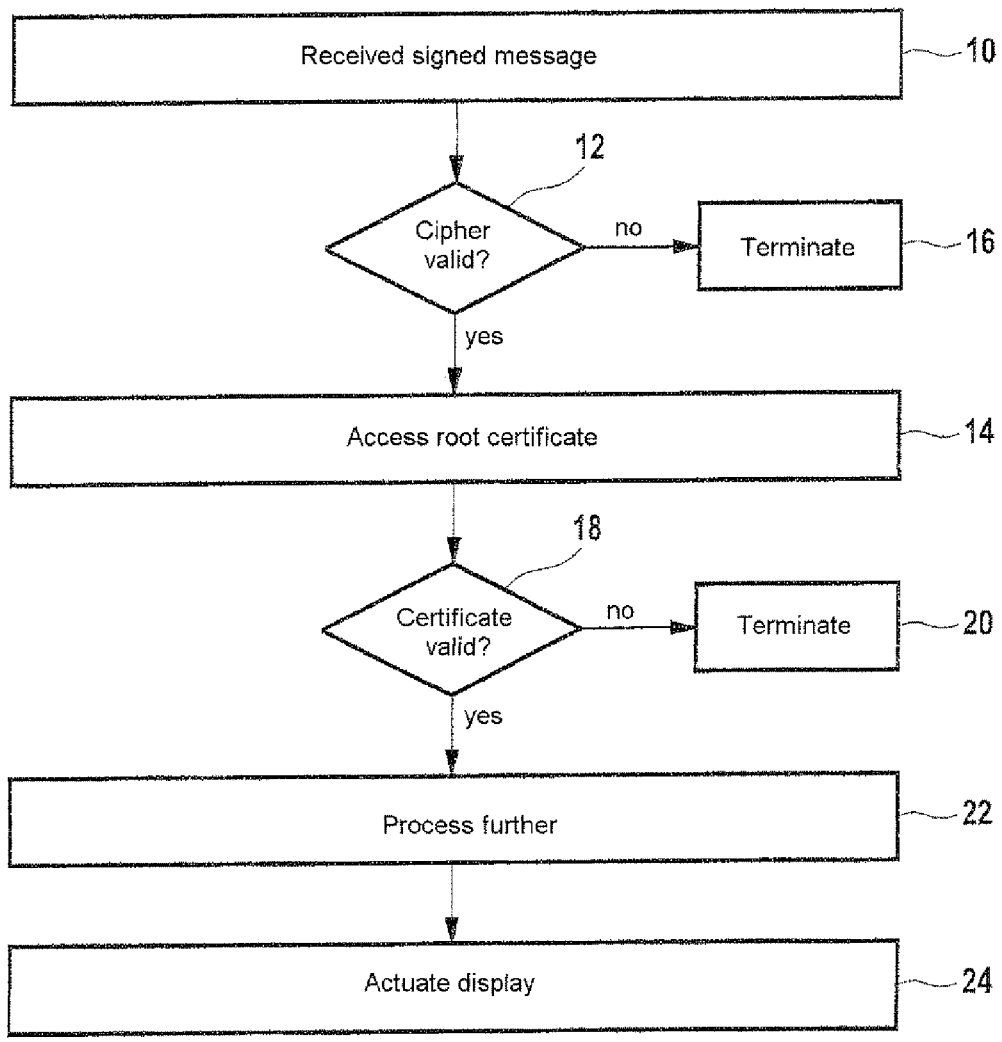
Figure 3:
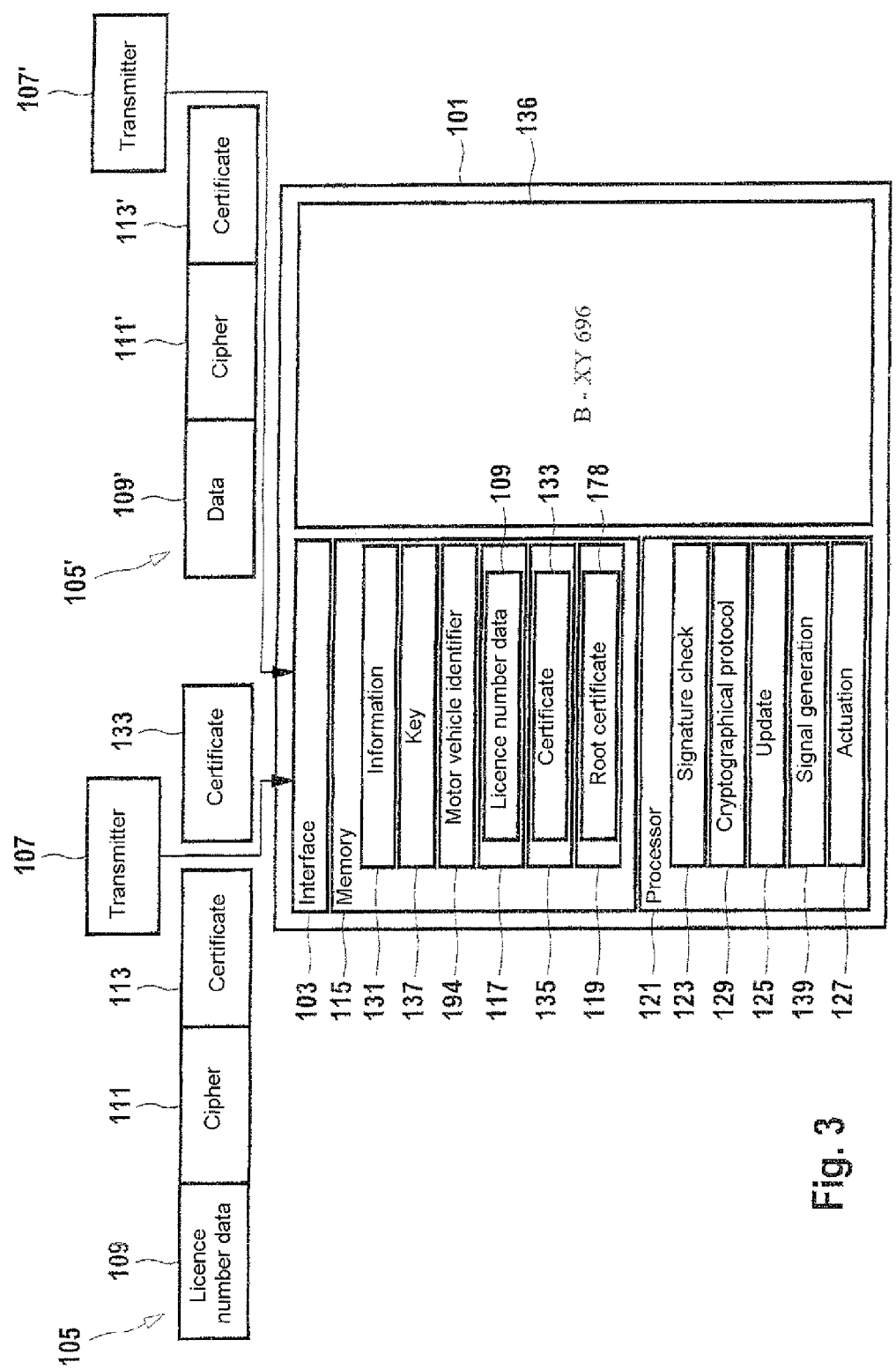
Figure 4:
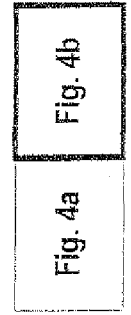
Figure 4:
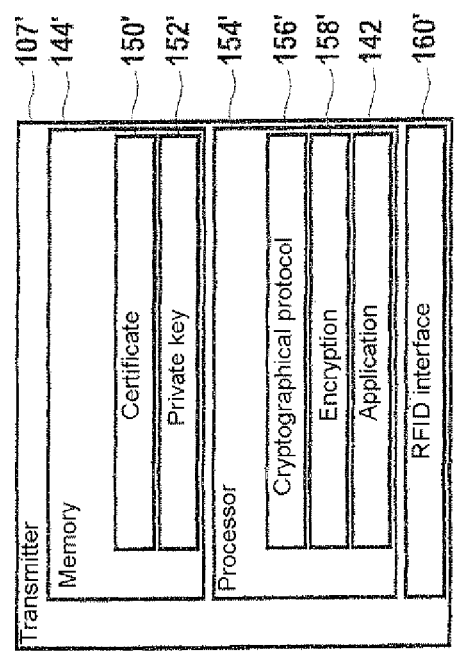
Figure 4:
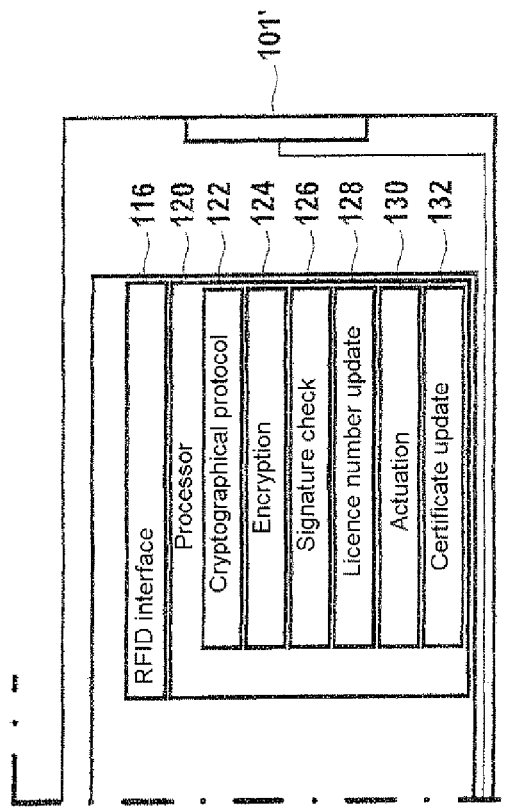
Figure 5:
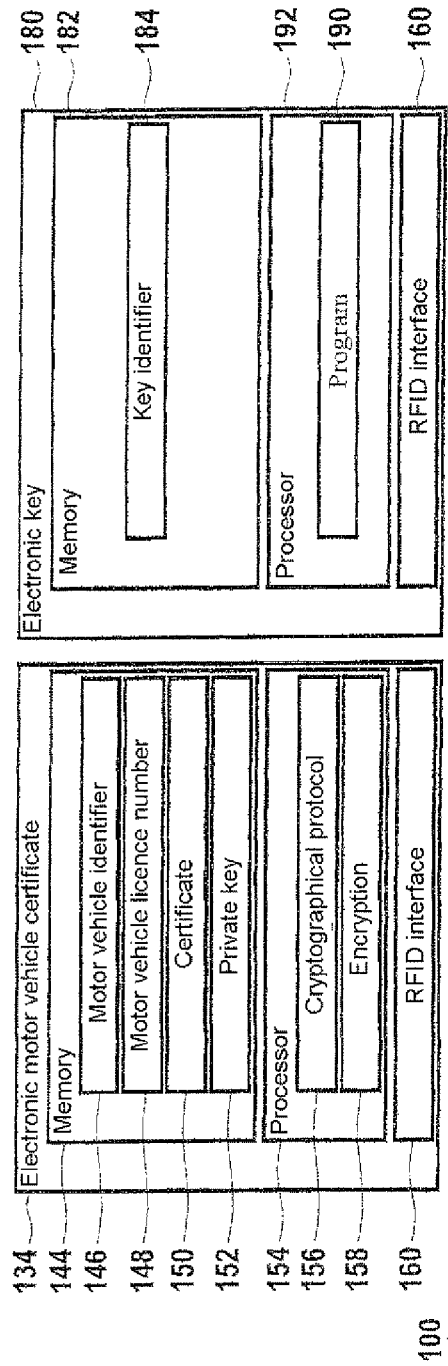
Figure 5:
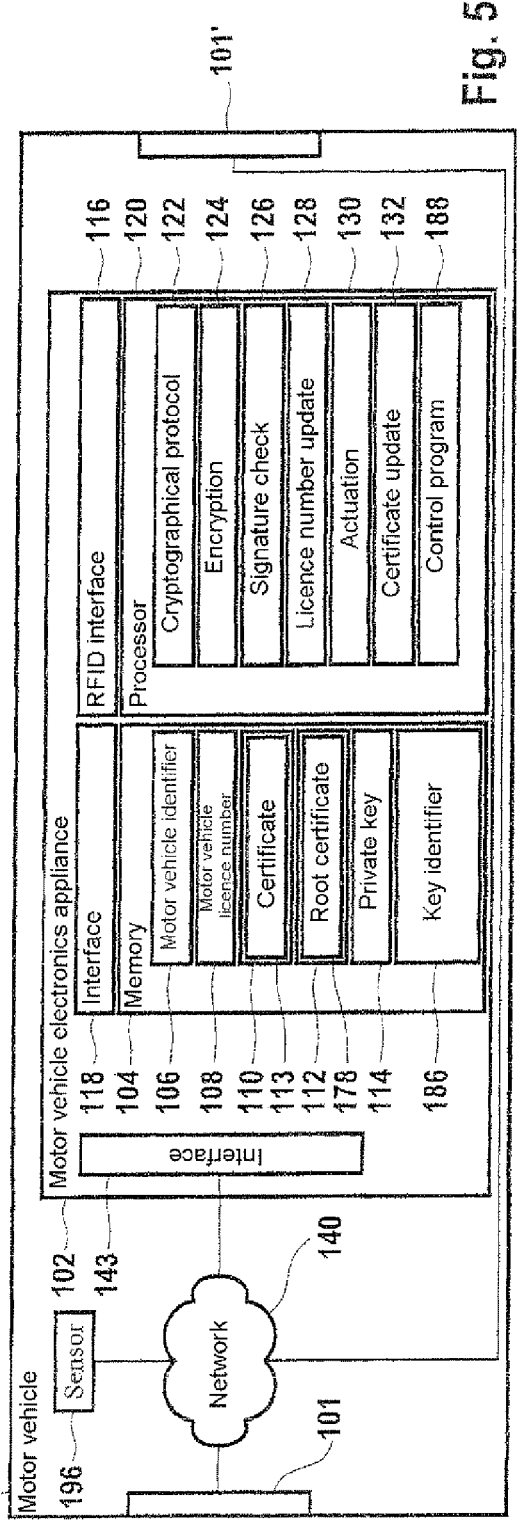

Embodiments of the invention are explained in more detail below with reference to the drawings, in which:

FIG. 1 shows a block diagram of a first embodiment of a motor vehicle display apparatus according to the invention, FIG. 2 shows a flowchart for an embodiment of a method according to the invention, FIG. 3 shows a block diagram for a further embodiment of a motor vehicle display apparatus according to the invention, FIG. 4 shows a block diagram for an embodiment of a motor vehicle electronic system according to the invention and for a motor vehicle according to the invention, FIG. 5 shows a block diagram for a further embodiment of a motor vehicle electronic system according to the invention and for a motor vehicle according to the invention.

Corresponding elements in the embodiments below are respectively denoted by the same reference symbols.

FIG. 1 shows an embodiment of a motor vehicle display apparatus 101 according to the invention. The motor vehicle display apparatus 101 has a display 136, which may have the format of a standard motor vehicle license plate, for example. The display 136 is used for reproducing the license number, such as the license number B-YX 696.

The motor vehicle display apparatus 101 has an interface 103 for receiving a message 105 from a transmitter 107, for example. The message 105 may contain the data 109 to be reproduced on the display 136, i.e. the license number data, a cipher 111 and a certificate 113, for example. The cipher 111 and the certificate 113 form a digital signature for the data 109. By way of example, the cipher 111 is produced by encrypting the license number data using a private cryptographic key, said private cryptographic key needing to be associated with the public key indicated in the certificate 113.

The interface 103 can also be used to receive what is known as a root certificate 178.

The motor vehicle display apparatus 101 has an electronic memory 115 with a memory area 117 for storing the license number data and a memory area 119 for storing the root certificate 178.

The motor vehicle display apparatus 101 also has a processor 121 for executing a program module 123 for performing a signature check, a program module 125 for updating the root certificate 178 which is stored in the memory area 119, and a program module 127 for actuating the display 136. The functionality of the actuation of the display 136 can be implemented using a driver, which may be part of the processor 121, in the form of a separate component or in the form of an integrated component of the display 136.

The root certificate 178 has a defined validity period of three years, for example. The current root certificate 178 can initially be stored in the memory area 119 by the manufacturer, for example, so that a motor vehicle equipped with the motor vehicle display apparatus 101 is already provided with a valid root certificate when it is delivered to the customer.

The motor vehicle is allocated a license number by a motor vehicle registration authority, for example. The relevant data 109 are encrypted using the private key, for example of the motor vehicle registration office, so that the cipher 111 is obtained as a result. The message 105 with the data 109, the cipher 111 and the certificate 113 from the motor vehicle registration office is then sent by the transmitter 107 to the interface 103 of the motor vehicle display apparatus 101. Next, the program module 123 is started in order to check the signature of the message 105. To this end, the following checks are specifically performed:

1. The cipher 111 is decrypted using the public key indicated in the certificate 113. The result of the decryption of the cipher 111 must match the data 109 in order for the signature to be able to be valid.
2. The certificate 113 is subjected to a certificate chain check using the root certificate 178 stored in the memory area 119. A successful certificate chain check is a further prerequisite for validity of the signature.

If the signature of the message 105 is valid, the data 109 are written to the memory area 117, this sometimes involving previously stored license number data being overwritten in the memory area 117.

The program module 127 is executed continuously and accesses the memory area 117 in which the respective current data 109 is stored. The updating of the license number data in the memory area 117 thus accordingly changes the license number of the motor vehicle which is reproduced on the display 136.

Since the root certificate stored in the memory area 119 has only a limited validity period, it is updated from time to time. This is done as follows: when the interface 103 receives a root certificate 178, execution of the program module 125 replaces the root certificate stored in the memory area 119 with the newly received root certificate 178 by overwriting it.

The message 105 and the root certificate 178 can be received from the same transmitter 107 or from different transmitters 107. By way of example, the transmitter 107 is associated with the motor vehicle registration authority; in particular, the transmitter 107 may be in the form of a ID token 134 (cf. FIGS. 4 and 5 below).

A transmitter 107 for sending the root certificate 178 may, by way of example, be in the form of a motor vehicle electronics appliance 102 (cf. the embodiment in FIGS. 4 and 5) or in the form of a terminal 162, for example in a motor vehicle workshop or in a motor vehicle testing institute, such as the German Association for Technical Inspection (TOV), so that the root certificate 178 is sent to the interface 103 on the occasion of servicing or a general inspection.

The interface 103 is also designed to receive a message 105'. The message 105' can be received from the transmitter 107 or from another transmitter 107'. By way of example, the transmitter 107' may be a sensor in the motor vehicle, a motor vehicle electronics appliance, such as an ECU in the motor vehicle, or a mobile or fixed transmitter, the mobile or fixed transmitter being operated by an authority, the police or another institution authorized to do so, for example.

The message 105' contains data 109' which form the first signal. In addition, the message 105' contains a cipher 111' and a certificate 113'. The cipher 111' and the certificate 113' form a digital signature for the data 109'. By way of example, the cipher 111' is produced by encrypting the data 109' using a private cryptographic key, said private cryptographic key needing to be associated with the public key indicated in the certificate 113'.

By way of example, the data 109' may contain a piece of information, such as a vehicle parameter. By way of example, a sensor is used to pick up a current exhaust value for the motor vehicle. The sensor delivers this information to the transmitter 107', which sends this information in the form of the data 109' as part of the message 105' to the motor vehicle display apparatus 101. As an alternative or in addition, the information may contain other vehicle parameters, such as the speed of the motor vehicle, the noise level currently being produced by the motor vehicle or other environmental-related and/or safety-related vehicle parameters.

As an alternative or in addition, the data 109' may contain a piece of charge-related information, such as a charge status. In this embodiment, the transmitter 107' is in the form of a motor vehicle electronics appliance, for example. The motor vehicle electronics appliance establishes whether a required charge, such as a toll charge, a tax or an exhaust charge, has been paid or needs to be paid for the motor vehicle. An appropriate piece of information indicating the charge status is sent by the motor vehicle electronics appliance as message 105' to the motor vehicle display apparatus 101.

When the message 105' has been received by the motor vehicle display apparatus 101, the program module 123 is started in order to perform a signature check on the signature formed by the cipher 111' and the certificate 113'. If the signature is valid, the information contained in the data 109' is stored in a memory area 131 of the electronic memory 115. The execution of a program module 139 is then started by the processor 121.

The program module 139 is used for generating the second signal. By way of example, the second signal is input into the program module 127 in order to actuate the display 136 to visually output the second signal. By way of example, the second signal is meant to be used to output the piece of information stored in the memory area 131: to this end, the program module 139 accesses the information stored in the memory area 131 and generates the second signal, for example using a modulation method, the second signal being modulated with the information.

The program module 139 may also be designed such that the information is subjected to a data processing operation and the result of said data processing operation is used for modulating the second signal in order to visually output said result of the data processing operation via the display 136.

The data 109' may also be a command, such as a request command. By way of example, the request command is used to request the information stored in the memory area 131. In this case, the validity of the signature data 109' is again checked first of all. If the signature is valid, the memory area 131 is then accessed in order to read the information therefrom. This information is then used to generate the second signal by executing the program module 139, and is visually output via the display 136.

By way of example, the motor vehicle display apparatus 101 first of all receives a first message 105' from a transmitter 107' in the motor vehicle, i.e. from a sensor or from an ECU, for example. The first message 105' contains a vehicle parameter. This vehicle parameter is written to the memory area 131 as a piece of information if the signature of the first message 105' is valid.

At a subsequent time, the motor vehicle display apparatus 101 receives a second message 105' from an external transmitter, the data 109' in this case containing a request command for requesting the information. If the signature of the second message 105' is valid, the information is then read from the memory area 131, the second signal is generated and is visually output via the display 136.

FIG. 2 shows a flowchart for an embodiment of a method according to the invention. In step 10, the motor vehicle display apparatus receives a signed message with license number data and a signature for the license number data, the signature being formed from a cipher for the license number data and an associated certificate.

In step 12, a check is performed to determine whether the cipher is valid. To this end, the cipher is decrypted using the public key indicated in the certificate of the message, for example. If the result of the decryption matches the license number data in the message, the cipher is considered to be valid and the flow control passes to step 14; in the opposite case, the flow is terminated in step 16.

In step 14, the root certificate stored in the memory of the motor vehicle display apparatus is accessed in order to check, in step 18, whether the certificate received with the message for the signature is valid. To this end, the root certificate is used to perform a certificate chain check. If the certificate is not valid, the flow is terminated in step 20.

If the certificate is valid, the license number data received with a message are processed further in step 22. This can done such that the license number data are stored in the memory of the motor vehicle display apparatus so as to actuate a display of the motor vehicle display apparatus in step 24, so that the updated license number data are reproduced by the display.

If, on the other hand, a signed message is received by the motor vehicle display apparatus in step 10 which, instead of the license number data, contains a piece of information, such as a vehicle parameter or a charge status, or a command, such as a request command, then steps 12 to 20 are likewise performed for this message. In step 22, the data are processed further, for example by virtue of the information contained in the data being stored in a memory in the motor vehicle display apparatus or by virtue of the information being requested from the memory so as subsequently to visually output it in step 24.

FIG. 3 shows a block diagram for an embodiment of a motor vehicle display apparatus 101 according to the invention which has an associated certificate 133. The electronic memory 115 of the motor vehicle display apparatus 101 has a memory area 135 for storing the certificate 133. Like the root certificate 178 (cf. FIG. 1), the certificate 133 thus also has a limited validity period. Preferably, the validity periods of the root certificate 178 and the certificate 133 are chosen such that they expire at the same time. This allows the frequency of updates to be minimized.

The electronic memory 115 of the motor vehicle display apparatus 101 stores a private key for the motor vehicle display apparatus 101 in a protected memory area 137. The certificate 133 is associated with this private key, since the certificate 133 contains a public key, with the private and the public key forming an asymmetric key pair.

In addition to the embodiment in FIG. 1, the processor 121 is used for executing a program module 129 which implements the steps of a cryptographical protocol which relate to the motor vehicle display apparatus 101. Execution of the cryptographical protocol allows unilateral or reciprocal authentication of the motor vehicle display apparatus 101 and the transmitter 107 or 107' to be performed, for example on the basis of what is known as a challenge-response method.

The certificate 133 can initially be stored in the memory area 135 by the manufacturer, with the result that the certificate 133 is already stored in the memory 115 when the new motor vehicle is delivered to the customer.

If the embodiment under consideration in the present case is intended to involve the license number data being initialized or updated, it is first of all necessary for unilateral or reciprocal authentication to be performed between the motor vehicle display apparatus 101 and the transmitter 107. This is done as follows, for example: The program module 129 accesses the certificate 133 stored in the memory area 135 in order to send it from the interface 103 to the transmitter 107. The transmitter 107 then generates what is known as a challenge, i.e. a random number, for example. This random number is encrypted using the public key contained in the certificate 133.

The resulting cipher is sent from the transmitter 107 to the interface 103. The program module 129 decrypts the cipher using the private key stored in the memory area 137 and in this way obtains the random number. This random number is returned to the transmitter 107 by the program module 129 via the interface 103. At the transmitter end, a check is then performed to determine whether the random number received from the motor vehicle display apparatus matches the originally generated random number, i.e. the challenge. If this is the case, then the motor vehicle display apparatus 101 is deemed to have been authenticated to the transmitter 107. The transmitter 107 can be authenticated to the motor vehicle display apparatus 101 in a similar fashion.

Only when the unilateral or reciprocal authentication has been performed is the interface 103 ready to receive the message 105.

The certificate 133 is updated as follows:

The transmitter 107 sends the updated certificate 133 to the interface 103. By executing the program module 125, the updated certificate 133 is then written to the memory area 135, with the previous certificate being overwritten. The public key of the certificate 133 remains unchanged in this case, since the private key stored in the memory area 137 is also meant to remain unchanged.

In addition, the message 105 may contain a tag which may likewise have been signed. This tag may be the motor vehicle identifier stored in the memory area 194 of a motor vehicle electronics appliance 102 (cf. the embodiment in FIGS. 4 and 5). In addition to the validity of the signature, the motor vehicle display apparatus 101 then checks whether the tag received with the message 105 matches the motor vehicle identifier stored in the memory area 194 of the motor vehicle display apparatus 101. This may be a further necessary prerequisite for the license number data being written to the memory area 117.

If the embodiment considered in the present case is intended to involve reception of the message 105' being taken as a basis for output of a visual signal by the display 136, it is first of all necessary to perform unilateral or reciprocal authentication between the display apparatus 101 and the transmitter 107'. This is done as follows, for example:

The program module 129 accesses the certificate 133 stored in the memory area 135 in order to send it from the interface 103 to the transmitter 107'. The transmitter 107' then generates what is known as a challenge, i.e. a random number, for example. This random number is encrypted using the public key contained in the certificate 133'.

The resulting cipher is sent from the transmitter 107' to the interface 103. The program module 129 decrypts the cipher using the private key stored in the memory area 137 and thus obtains the random number. This random number is returned to the transmitter 107' by the program module 129 via the interface 103. At the transmitter end, a check is then performed to determine whether the random number received from the motor vehicle display apparatus matches the originally generated random number, i.e. the challenge. If this is the case then the motor vehicle display apparatus 101 is deemed to have been authenticated to the transmitter 107'. The transmitter 107' can be authenticated to the motor vehicle display apparatus 101 in a similar fashion.

Only when the unilateral or reciprocal authentication has been performed is the interface 103 ready to receive the message 105'.

FIG. 4 schematically shows a motor vehicle 100, such as an automobile. The motor vehicle 100 has at least one motor vehicle electronics appliance 102, which may be in the form of what is known as an electronic control unit (ECU), for example.

The motor vehicle electronics appliance 102 has an electronic memory 104 with at least the memory areas 106, 108, 110, 112, and 114. The memory area 106 is used for storing a motor vehicle identifier, i.e. what is known as a unique identifier, such as the chassis number of the motor vehicle 100. Preferably, the memory area 106 is designed such that the motor vehicle identifier stored therein cannot be changed, as a result of which the motor vehicle electronics appliance 102 is thus permanently associated with the motor vehicle 100.

The memory area 108 is used for storing data which contain the motor vehicle license number of the motor vehicle 100, i.e. the data 109 (cf. FIGS. 1 and 3). These data can be updated via an interface 116 of the motor vehicle electronics appliance 102. In the embodiment considered in the present case, the interface 116 is of contactless design as a radio interface operating on the basis of an RFID method.

The memory area 110 is used for storing a certificate 113 for the motor vehicle 100, the certificate being able to be a standardized certificate for a PKI, for example. The memory area 112 is used for storing the root certificate 178 of the PKI.

The memory area 114 of the memory 104 stores the private key of the motor vehicle 100, which private key is associated with the certificate 113. This memory area 114 cannot be accessed externally, in principle, via the interface 116 or via a further interface 118 of the motor vehicle electronics appliance 102.

The interface 118 is of contact-based design for the connection of a cable, for example. The interface 118 can be used to effect external access to the memory areas 110 and 112 in order to update the certificate 113, the certificate 133 and/or the root certificate 178.

The motor vehicle electronics appliance 102 also has at least one processor 120 for executing program modules 122, 124, 126, 128, 130 and 132.

The program module 122 is used for executing those steps of a cryptographical protocol which relate to the motor vehicle electronics appliance 102 for the purpose of authenticating the motor vehicle electronics appliance 102 to an ID token 134. Preferably, the program module 122 is designed such that the ID token 134 is also authenticated to the motor vehicle electronics appliance 102.

The program module 124 is used to encrypt data which are interchanged between the motor vehicle electronics appliance 102 and the ID token 134. In this case, encryption can be effected using a symmetric key or an asymmetric key.

The program module 126 is used for performing a signature check on an electronic signature received from the ID token 134. To this end, the program module 126 accesses the memory area 112 in order to retrieve the root certificate 178 therefrom.

The program module 128 is started to update the data stored in the memory area 108, which contain the motor vehicle license number. The program module 130 is used to actuate the motor vehicle display apparatuses 101 and 101' of the motor vehicle 100. The motor vehicle display apparatuses 101 and 101' may be arranged on the motor vehicle 100 at the locations at which the license plates are normally arranged. The motor vehicle display apparatuses 101 and 101' are connected to the motor vehicle electronics appliance 102 by means of protected data transmission channels. By way of example, the data transmission channels can be implemented by means of a network 140, for example by means of a bus system in the motor vehicle 100. To this end, the motor vehicle electronics appliance 102 has an end face 143 which can be used to set up the data transmission channels to the motor vehicle display apparatuses 101 and 101'.

The program module 132 is started in order to update the certificate 113 stored in the memory area 110 and/or the root certificate stored in the memory area 112 and/or the certificate 133 via the interface 118.

The motor vehicle electronics appliance 102 may be implemented as a system comprising a plurality of physically separate electronic components which are connected to one another by means of a bus system in the motor vehicle 100, for example. Accordingly, the memory 104 may also be implemented in a form distributed over various such components which collectively form the motor vehicle electronics appliance 102. A corresponding situation applies to the processor 120.

The ID token 134 has an electronic memory 144 with protected memory areas 146, 148, 150 and 152. The memory area 146 is used for storing the motor vehicle identifier, which is also stored in the memory area 106 of the memory 104 in the motor vehicle electronics appliance 102. This explicitly associates the ID token 134 with the motor vehicle 100. The memory area 146 may additionally store a signature for the motor vehicle identifier.

The memory area 148 stores the data 109 which contain the current motor vehicle license number of the motor vehicle 100. In addition, the memory area 148 may store a digital signature for said data 109. These data 109 may have been written to the memory area 148 by a server computer in the motor vehicle registration office.

The memory area 150 is used for storing a certificate for the ID token 134. The memory area 152 is used for storing a private key with which the certificate stored in the memory area 150 is associated.

The ID token 134 also has a processor 154 for executing program modules 156 and 158, which correspond to the program modules 122 and 124. The program module 156 is used for executing those steps of the cryptographical protocol which relate to the ID token 134. The program module 158 is used for setting up the encrypted connection to the motor vehicle electronics appliance 102, particularly a connection with end-end encryption using a symmetric or asymmetric key.

The ID token 134 also has an interface 160 which corresponds to the interface 116 of the motor vehicle electronics appliance 102 and, for example, is in the form of a radio interface operating on the basis of an RFID method.

The ID token 134 may be a document, such as an electronic motor vehicle registration certificate or an electronic motor vehicle registration document, as shown in FIG. 1. The document may be in card form, for example.

The motor vehicle electronics appliance 102 can be connected by means of its interface 118 to a terminal 162. The terminal 162 has an interface 164 which corresponds to the interface 118 of the motor vehicle electronics appliance 102. By way of example, the interfaces 164 and 118 can be connected using a cable, to which end the engine hood of the motor vehicle 100 typically needs to be opened.

The terminal 162 has at least one processor 166 for executing a program 168 and also a network interface 170 for communicating with a server computer 172 via a network 174.

The server computer 172 provides a certificate provider, for example in the form of a database 176 which stores current certificates for various motor vehicles and the motor vehicle display apparatuses thereof. In this case, the access key used for the certificates stored in the database 176 is the respective motor vehicle identifier. In addition, the server computer 172 can also provide an updated root certificate 178.

The motor vehicle license number is updated as follows:

1. First of all, the user, i.e. the keeper of the motor vehicle 100, for example, calls up an online service on a server computer, for example a motor vehicle registration authority. This can be done using a personal computer of the keeper via the Internet. The personal computer has a reader for communicating with the ID token 134. The personal computer and the reader thereof are used to set up a protected connection to the server of the motor vehicle registration office, which connection is used to write the data 109 with the updated motor vehicle license number and possibly the signature thereof to the memory area 146 of the ID token 134.

2. When the user with the ID token 134 is in reception range of the interface 116, the program module 128 is started in order to update the motor vehicle license number. This can be done manually by virtue of the user operating an operator control element on the motor vehicle 100, which may be arranged on the dashboard of the motor vehicle 100, for example. Alternatively, the program module 128 can be executed continuously. Execution of the program module 128 then transmits signals cyclically from the interface 116 within certain intervals of time in order to check whether the ID token 134 is in the reception range of the interface 116.

The motor vehicle license number is then updated by setting up a connection between the interfaces 116 and 160. By way of example, the program module 128 accesses the certificate 113 stored in the memory area 110 in order to send it from the interface 116 to the ID token 134. The program module 156 of the ID token 134 then generates what is known as a challenge, i.e. a random number, for example. This random number is encrypted with the public key of the motor vehicle 100 which is contained in the certificate 113.

The resulting cipher is sent from the ID token 134 via the connection to the interface 116 of the motor vehicle electronics appliance 102. The program module 122 decrypts the cipher using the private key of the motor vehicle 100 which is stored in the memory area 114 and thus obtains the random number. This random number is returned to the ID token 134 by the program module 122 via the interface 116.

Execution of the program module 156 performs a check therein to determine whether the random number received from the motor vehicle electronics appliance 102 matches the originally generated random number, i.e. the challenge. If this is the case, the motor vehicle electronics appliance 102 is deemed to have been authenticated to the ID token 134. The random number can be used as a symmetric key for the end-end encryption which is performed by the program modules 124 and 158.

Optionally, the ID token 134 can be authenticated to the motor vehicle electronics appliance 102 in a similar fashion.

The unilateral or reciprocal authentication may also involve the use of the motor vehicle identifier which is stored in the memory areas 106 and 146. By way of example, the ID token 134 sends the motor vehicle identifier signed by the ID token 134 to the motor vehicle electronics appliance 102. The motor vehicle electronics appliance 102 then checks the signature and compares the motor vehicle identifier received from the ID token 134 with the motor vehicle identifier stored in the memory area 106. If the signature is valid and the motor vehicle identifiers match, the ID token 134 is deemed to be authentic.

3. When the unilateral or reciprocal authentication of the motor vehicle electronics appliance 102 and the ID token 134 has taken place, the motor vehicle electronics appliance 102 is provided with read authorization for accessing the memory area 148 of the ID token 134. The program module 128 then sends an appropriate read command from the interface 116 to the ID token 134. The ID token 134 then reads the license number data 109, possibly including the signature, from the memory area 148 and sends them to the interface 116 via the connection with end-end encryption. The program module 128 then starts the program module 126 in order to check the signature of the data 109 using the root certificate 112. If the signature is valid, the data are stored in the memory area 108, with the data previously stored therein being able to be overwritten.

Execution of the program module 130 then generates the message 105 (cf. FIG. 1 and FIG. 3). This can be done such that the data 109 are encrypted with the private key stored in the memory area 114 so as to produce the cipher 111. This message 105 is then sent via the data transmission channels to the motor vehicle display apparatuses 101 and 101', where the license number data, i.e. the data 109, are updated accordingly, so that the updated license number data are reproduced on the displays of the motor vehicle display apparatuses 101 and 101'.

The certificates 113 and 178 stored in the memory areas 110 and 112 are updated as follows:

A connection is set up between the interfaces 118 and 164, for example using a cable. Execution of the program 168 reads the motor vehicle identifier from the memory area 106 of the motor vehicle electronics appliance 102. The program 168 then generates a request for the server computer 172, said request containing this motor vehicle identifier.

This request is sent by the terminal 162 from its network interface 170 via the network 174 to the server computer 172. On the basis of said request, the server computer accesses the database 176 in order to use the motor vehicle identifier to read the current certificate 113 associated with the motor vehicle identifier. The certificate 113 and the current root certificate 178 are sent by the server computer 172 via the network 174 to the terminal 162, and from there execution of the program 168 transmits them via the connection between the interface 164 and the interface 118 to the motor vehicle electronics appliance 102, where the current certificate 113 is stored in the memory area 110 and the current root certificate 178 is stored in the memory area 112 by virtue of the respective certificates previously stored therein being overwritten.

By way of example, the terminal may be part of a workshop which updates the certificates in this manner on the occasion of regular servicing of the motor vehicle 100. The terminal may also be part of a test center, such as the German Association for Technical Inspection (TOV), which updates the certificates on the occasion of what is known as a general inspection.

In one alternative embodiment, the interface 118 is designed such that it can communicate directly with the server computer 172, for example via a mobile radio link.

The database 176 may store not only the current certificates 113 but also the current certificates 133 of the motor vehicle display apparatuses in the motor vehicles. In that case, not only the current certificate 113 and the current root certificate 178 but also the current certificates 133 and 133' of the motor vehicle display apparatuses 101 and 101' in the motor vehicle 100 are received using the interface 118. The motor vehicle electronics appliance 102 then forwards the root certificate 178 via the data transmission channels to the motor vehicle display apparatuses 101 and 101' in order to update the root certificates stored therein (cf. embodiment in FIG. 1).

In addition, the motor vehicle electronics appliance 102 also forwards the updated certificates 133 and 133' via the data transmission channels to the motor vehicle display apparatuses 101 and 101', so that the certificates stored therein are respectively updated (cf. embodiment in FIG. 3).

The interface 116 of the motor vehicle electronics appliance 102 may be designed such that it can receive the message 105' from the external transmitter 107' (cf. the embodiments in FIGS. 1 and 3). In the embodiment considered in the present case, the transmitter 107' has an electronic memory 144' with protected memory areas 150' and 152'. The memory area 150' is used for storing a certificate for the transmitter 107'. The memory area 152' is used for storing a private key with which the certificate stored in the memory area 150' is associated.

The transmitter 107' also has a processor 154' for executing program modules 156' and 158', which correspond to the program modules 122 and 124. The program module 156' is used for executing those steps of the cryptographical protocol which relate to the transmitter 107'. The program module 158' is used for setting up an encrypted connection to the motor vehicle electronics appliance 102, particularly a connection with end-to-end encryption using a symmetric or asymmetric key.

The processor 154 is also used for executing an application program 142.

The transmitter 107' also has an interface 160' which corresponds to the interface 116 of the motor vehicle electronics appliance 102 and, by way of example, is in the form of a radio interface operating on the basis of an RFID method.

The transmitter 107' may be a mobile or fixed external transmitter. By way of example, the transmitter 107' may be arranged at the edge of or above a carriageway, so that the encrypted connection can be set up to a passing motor vehicle. The transmitter 107' may also be fitted in a police vehicle, for example, in order to inspect a passing motor vehicle from the police vehicle by setting up the encrypted connection.

When the motor vehicle 100 is close to the transmitter 107', a connection is set up between the interfaces 116 and 160'. By way of example, the program module 128 accesses the certificate 113 stored in the memory area 110 in order to send it from the interface 116 to the transmitter 107' after an appropriate request has been received from the transmitter 107'.

The program module 156' of the transmitter 107' then generates what is known as a challenge, i.e. a random number, for example. This random number is encrypted using the public key of the motor vehicle 100 which is contained in the certificate 113.

The resulting cipher is sent from the transmitter 107' via the connection to the interface 116 of the motor vehicle electronics appliance 102. The program module 122 decrypts the cipher using the private key of the motor vehicle 100 which is stored in the memory area 114 and thus obtains the random number. The random number is returned by the program module 122 to the transmitter 107' via the interface 116.

Execution of the program module 156' performs a check therein to determine whether the random number received from the motor vehicle electronics appliance 102 matches the originally generated random number, i.e. the challenge. If this is the case, the motor vehicle electronics appliance 102 is deemed to have been authenticated to the transmitter 107'. The random number can be used as a symmetric key for the end-to-end encryption which is performed by the program modules 124 and 158'.

Optionally, the transmitter 107 can be authenticated to the motor vehicle electronics appliance 102 in a similar fashion.

The unilateral or reciprocal authentication may also involve the use of the motor vehicle identifier which is stored in the memory area 106. By way of example, the transmitter 107' has access to a copy of the motor vehicle identifier. The transmitter 107' signs the motor vehicle identifier and sends the signed motor vehicle identifier to the motor vehicle electronics appliance 102. The motor vehicle electronics appliance 102 then checks the signature and compares the motor vehicle identifier received from the transmitter 107 with the motor vehicle identifier stored in the memory area 106. If the signature is valid and the motor vehicle identifiers match, an authentication condition is thus deemed to have been met.

When the unilateral or reciprocal authentication of the motor vehicle electronics appliance 102 and the transmitter 107' has been performed, the transmitter 107' sends the message 105' to the interface 116 via the protected connection with end-to-end encryption. The motor vehicle electronics appliance 102 forwards the message 105' via its interface 143 and the network 140 to the motor vehicle display apparatuses 101 and 101', where the message 105' is processed further in accordance with the embodiments in FIGS. 1 and 2, for example.

Alternatively, the motor vehicle electronics appliance 102 may also be designed such that reception of the message 105' is followed by the signature being checked by means of execution of the program module 126. If the signature is valid, the data 109' in the message 105' are forwarded via the interface 143 and the network 140 to the motor vehicle display apparatuses 101 and 101'.

Alternatively, the motor vehicle electronics appliance 102 may also be designed such that in addition to the check on the signature of the message 105', the second signal is also generated by the motor vehicle electronics appliance 102. If the result of the signature check is that the signature of the message 105' is valid, the motor vehicle electronics appliance 102 thus generates the second signal and sends it via the interface 143 and the network 140 to the motor vehicle display apparatuses 101 and 101', so that the second signal is visually output by the motor vehicle display apparatuses 101 and 101'.

The network 140 may have a sensor 196 connected to it. The sensor 196 may be designed to pick up a vehicle parameter, such as an environment-related or safety-related vehicle parameter, such as a noise or exhaust emission value. The sensor 196 provides a sensor signal which contains the relevant information. By way of example, the sensor signal is sent by the sensor 196 via the network 140 to the motor vehicle electronics appliance 102, which then generates a message 105' which contains the information provided by the sensor 196 and a signature generated using the private key 114. Alternatively, the message 105' is generated by the sensor 196 itself. This message 105' is then sent by the motor vehicle electronics appliance 102 or by the sensor 196 to the motor vehicle display apparatuses 101 and 101' via the network 140.

FIG. 5 shows a further embodiment of the invention. In addition to the embodiment in FIG. 4, the interface 116 of the motor vehicle electronics appliance 102 is designed to communicate with an appropriate interface 160 of an ID token 180. By way of example, the ID token 180 may be in the form of an electronic key. The ID token 180 has a memory 182 for storing a key identifier 184 for the ID token 180. The key identifier is an identifier which explicitly or almost explicitly identifies the ID token 180.

A reference value for this key identifier 184 is stored in a memory area 186 of the motor vehicle electronics appliance 102.

The processor 120 of the motor vehicle electronics appliance 102 is in this case additionally used for executing a control program 188.

Execution of the control program 188 outputs signals cyclically from the interface 116. When the ID token 180 is in range of the interface 116, the ID token 180 responds to such a signal by transmitting the key identifier 184 to the interface 116, which is done by virtue of the program 190 being executed by the processor 192. The control program 188 then checks the key identifier 184 received via the interface 116 with the reference value stored in the memory area 186. If there is a match, the control program 188 actuates central locking for the motor vehicle 100 in order to enable the doors to be opened. As an alternative or in addition, the control program 188 can enable the starter motor of the motor vehicle 100 to be operated.

When not only the ID token 180 but also the ID token 134 are within range of the interface 116, the control program 188 starts the program module 128 for updating the license number.

LIST OF REFERENCE SYMBOLS

100 Motor vehicle
101 Motor vehicle display apparatus
102 Motor vehicle electronics appliance
103 Interface
104 Memory
105, 105' Message
106 Memory area
107, 107' Transmitter
108 Memory area
109 Data
110 Memory area
111 Cipher
112 Memory area
113, 113' Certificate
114 Memory area
115 Electronic memory
116 Interface
117 Memory area
118 Interface
119 Memory area
120 Processor
121 Processor 122 Program module
123 Program module
124 Program module
125 Program module
126 Program module
127 Program module
128 Program module
129 Program module
130 Program module
131 Memory area
132 Program module
133 Certificate
134 ID token
135 Memory area
136 Display
137 Memory area
138 Display
139 Program module
140 Network
142 Application program
143 Interface
144, 144' Memory
146 Memory area
148 Memory area
150, 150' Memory area
152, 152' Memory area
154, 154' Processor
156 Program module
158, 158' Program module
160, 160' Interface
162 Terminal
164 Interface
166 Processor
168 Program
170 Network interface
172 Server computer
174 Network
176 Database
178 Root certificate
180 ID token
182 Memory
184 Key identifier
186 Memory area
188 Control program
190 Program
192 Processor
194 Memory area

The invention claimed is:

1. A motor vehicle display apparatus having an electronic appliance configured for mounting in a motor vehicle, the electronic appliance comprising:
a first memory area for storing data, wherein the comprises motor vehicle information;
a second memory area for storing at least one first certificate;
a first interface for receiving a first signal and a signature for the first signal from a transmitter external to the motor vehicle;
a validity checking module, the validity checking module capable of checking the validity of the signature of the first signal using the first certificate;
a signal generation module, the signal generation module capable of accessing data from the first memory area in response to the first signal and generating a second signal carrying a representation of the accessed data;
a display actuating module responsive to the second signal, the display actuating module capable of actuating a display to visually output the representation of the accessed data;
a fourth memory area for storing a motor vehicle identifier; and
a tag verification module;
wherein the second signal is generated and/or output only if the signature is valid;
wherein the motor vehicle identifier explicitly identifies a motor vehicle with which the motor vehicle display apparatus is associated;
wherein the fourth memory area is a protected memory area;
wherein the first interface is designed to receive a message;
wherein the message contains at least the first signal, a tag and the signature of the first signal and/or of the tag;
wherein the tag verification module is capable of checking whether the tag matches the motor vehicle identifier stored in the fourth memory area and
wherein a prerequisite for the generation and/or output of the second signal is that the tag and the motor vehicle identifier match.

2. The motor vehicle display apparatus as claimed in claim 1, wherein the validity checking module is designed to perform a certificate chain check using the first certificate.

3. The motor vehicle display apparatus as claimed in claim 1, wherein the electronic appliance is an integrated electronic circuit.

4. The motor vehicle display apparatus as claimed in claim 1, wherein the electronic appliance and the display apparatus are inseparably connected to one another.

5. The motor vehicle display apparatus as claimed in claim 1, wherein the first interface is a radio interface.

6. The motor vehicle display apparatus as claimed in claim 1, wherein the first interface is designed to receive from a motor vehicle electronics appliance.

7. The motor vehicle display apparatus as claimed in claim 6, wherein the first interface further comprises a motor vehicle bus system interface.

8. The motor vehicle display apparatus as claim 1, additionally comprising a cryptographic authentication module, the cryptographic authentication module capable of cryptographically authenticating the transmitter, wherein the generation and/or output of the second signal presupposes that the cryptographic authentication of the transmitter has been performed successfully.

9. The motor vehicle display apparatus as claimed in claim 8, wherein a third memory area of the electronic appliance stores a second certificate, wherein the second certificate is associated with the electronic appliance, and wherein the cryptographic authentication module is designed to authenticate one another, the motor vehicle display apparatus being authenticated to the transmitter using the second certificate.

10. The motor vehicle display apparatus as claimed in claim 8, wherein the cryptographic authentication module is designed to perform a challenge—response protocol.

11. The motor vehicle display apparatus as claimed in claim 1, wherein the second signal contains the motor vehicle license number and/or a vehicle parameter and/or a charge information item.

12. The motor vehicle display apparatus as claimed in claim 1, wherein the second signal has been signed using a private key from the motor vehicle display apparatus, and the signature of the second signal is visually output via the display apparatus.

13. A motor vehicle display apparatus having an electronic appliance and a motor vehicle appliance,
the electronic appliance comprising:
a first memory area for storing data, wherein the data contains a motor vehicle license number;
a second memory area for storing at least one first certificate;
a first interface for receiving a first signal and a signature for the first signal from a transmitter;
a validity checking module, the validity checking module capable of checking the validity of the signature of the first signal using the first certificate;
a signal generation module, the signal generation module capable of for generating a second signal on the basis of the reception of the first signal; and
a display actuating module, the display actuating module capable of actuating a display apparatus to reproduce the data stored in the first memory area and to visually output the second signal,
wherein the second signal is generated and/or output only if the signature is valid, and
the motor vehicle appliance comprising:
a second interface for setting up a first connection to a first ID token in order to read the data from the first ID token;
a fifth memory area for storing the first certificate;
a sixth memory area for storing a third certificate, wherein the third certificate is associated with the motor vehicle electronics appliance;
a cryptographic authentication module, the cryptographic authentication module capable of cryptographic authentication to the first ID token using the first and/or the third certificate;
a third interface for receiving the at least first, second and third certificates; and
a fourth interface for actuating at least one of the motor vehicle display apparatuses via the first interface for the purpose of updating the data and the first and second certificates.

14. A method for visual output from a display of a display apparatus of a motor vehicle, the method comprising:
setting up a first connection between a motor vehicle electronics appliance of the motor vehicle and an external transmitter;
accessing a third memory area in the motor vehicle electronics appliance for the purpose of reading a third certificate;
cryptographically authenticating the motor vehicle electronics appliance and the external transmitter unilaterally or to one another using the third certificate;
receiving a first signal, a signature for the first signal, and a tag from an external transmitter via the first connection after the authentication has been performed successfully;
checking the validity of the signature of the first signal using a first certificate stored in a second memory area of the motor vehicle electronic appliance; and
checking, in a tag verification module of the motor vehicle electronic appliance, whether the tag matches a motor vehicle identifier stored in a protected memory of the motor vehicle electronic appliance;
if the signature is valid and the tag matches the motor vehicle identifier:
forwarding the first signal and the signature of the first signal from the motor vehicle electronics appliance to the motor vehicle display apparatus, or the motor vehicle electronics appliance:
accessing motor vehicle data contained in a first memory area of the motor vehicle electronic appliance in response to the first signal;
generating a second signal carrying a representation of the accessed data; and
actuating the display in response to the second signal to visually output the representation of the accessed data.

15. The method as claimed in claim 14, further comprising:
receiving the data and a signature for the data;
checking the validity of the signature of the data using the first certificate; and
storing the data in the first memory area if the signature of said data is valid, the data being displayed by accessing the first memory area.

16. The method as claimed in claim 14, wherein the validity of the signature is checked by performing a certificate chain check.

17. The method as claimed in claim 14, wherein a prerequisite for the generation and/or output of the second signal is that authentication of the transmitter has been performed.

18. The method as claimed in claim 17, wherein a prerequisite for the generation and/or output of the second signal is additionally that authentication of the motor vehicle display apparatus to the transmitter has been performed successfully.

19. The method as claimed in claim 14, wherein the second signal contains the motor vehicle license number and/or a vehicle parameter and/or a charge information item.

20. The method as claimed in claim 14, wherein the second signal has been signed using a private key from the motor vehicle display apparatus, and the signature of the second signal is visually output via the motor vehicle display apparatus, presupposing that the signature of the first signal is valid.

21. A computer program product comprising a non-transitory computer readable medium encoded with executable program instructions that, when executed by a computer, cause the computer to perform the method as claimed in claim 14.

22. The motor vehicle display apparatus as claimed in claim 1, further comprising a sensor operable to sense a parameter of the motor vehicle, wherein the motor vehicle information comprises the sensed motor vehicle parameter.

23. The method as claimed in claim 14, wherein the display is visible from outside of the vehicle.

24. The method as claimed in claim 14, wherein the transmitter is external to the outside of the vehicle.

* * * * *

UNITED STATES PATENT AND TRADEMARK OFFICE
CERTIFICATE OF CORRECTION

PATENT NO. : 8,812,842 B2
APPLICATION NO. : 13/129411
DATED : August 19, 2014
INVENTOR(S) : Manfred Paeschke, Frank Dietrich and Jorg Fischer Page 1 of 1

It is certified that error appears in the above-identified patent and that said Letters Patent is hereby corrected as shown below:

In the Claims

In Claim 1, Column 21, line 54 should read as follows:

a first memory area for storing data, wherein the data comprises

In Claim 8, Column 22, line 42 should read as follows:

8. The motor vehicle display apparatus as claimed in claim 1, addi-

Signed and Sealed this
Twenty-third Day of December, 2014

Michelle K. Lee
*Deputy Director of the United States Patent and Trademark Office*